United States Patent Office 3,330,130
Patented July 11, 1967

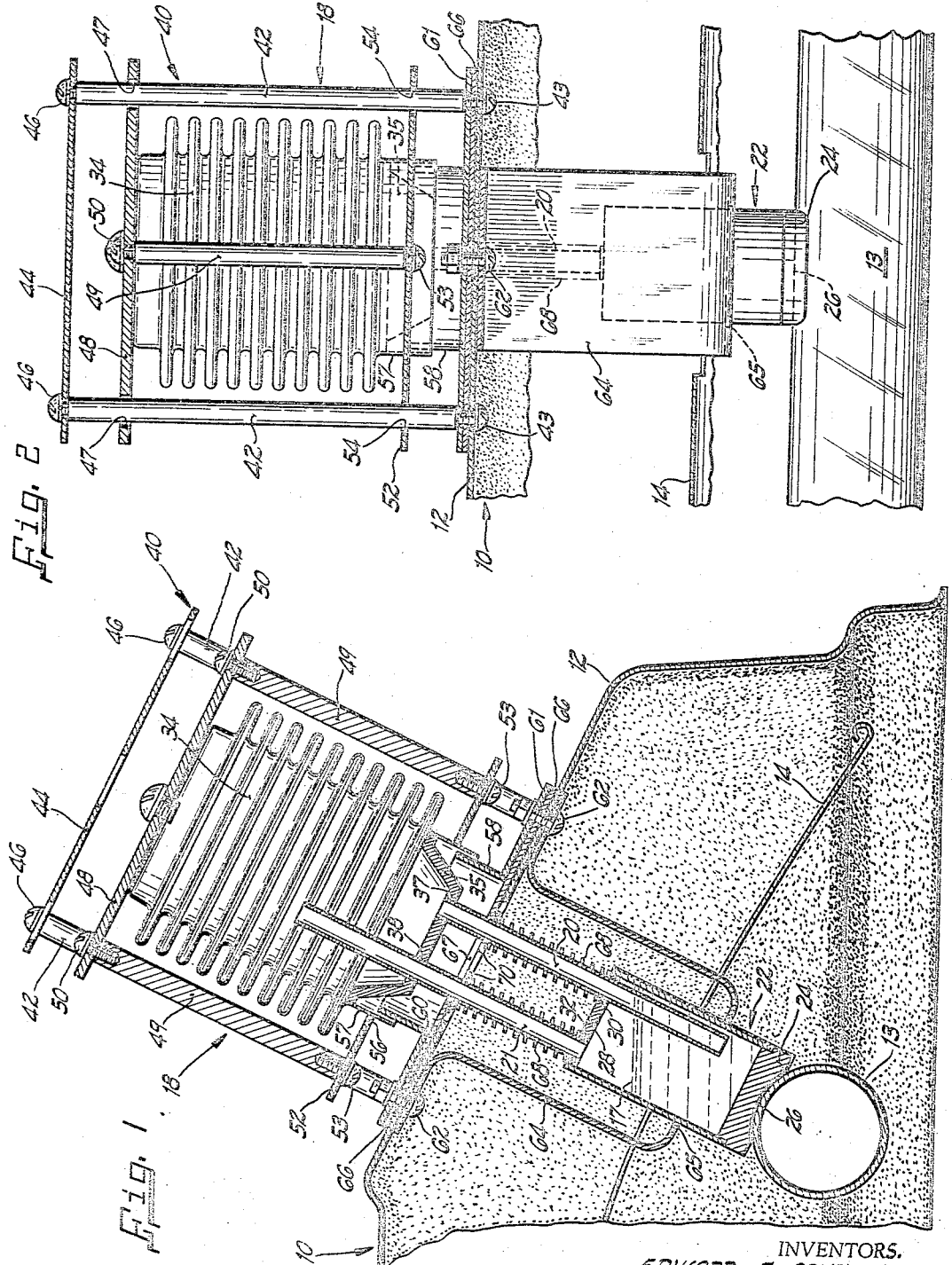

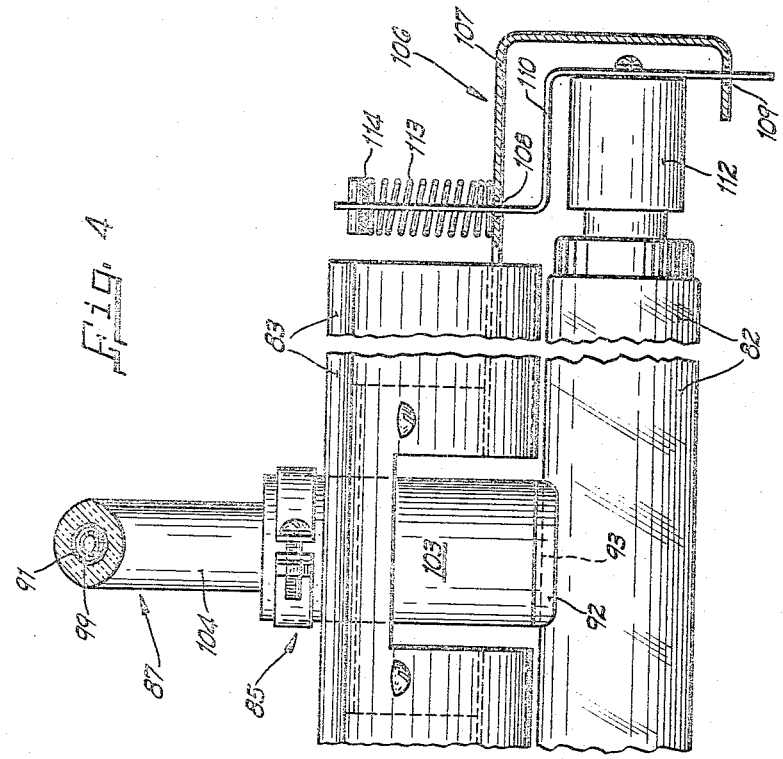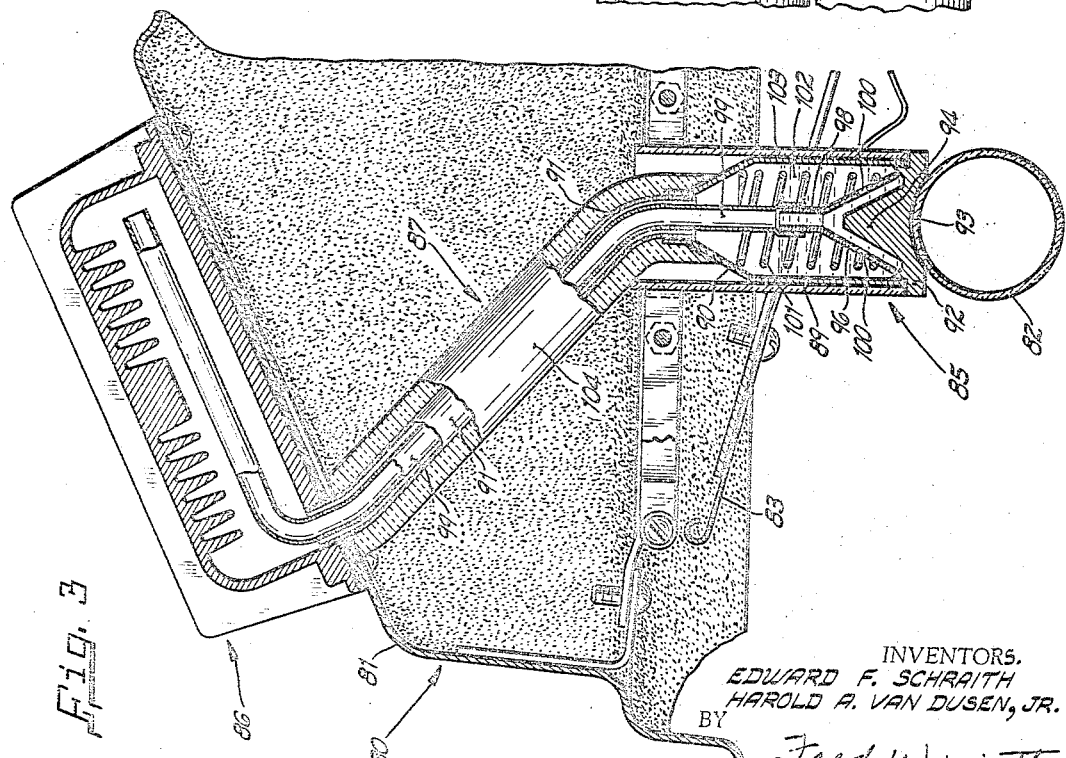

---

3,330,130
COOLING DEVICE FOR FLUORESCENT LAMPS
Edward F. Schraith, Milwaukee, and Harold A. Van Dusen, Jr., South Milwaukee, Wis., assignors to Mc-Graw-Edison Company, Milwaukee, Wis., a corporation of Delaware
Filed Mar. 4, 1963, Ser. No. 262,597
6 Claims. (Cl. 62—259)

This invention relates to a device for cooling a vapor type lamp and more specifically to a refrigerating device for spot cooling a localized portion on the bulb wall of a fluorescent type lamp so that the latter will operate at an optimum value of light output.

It is well known that fluorescent type lamps are extremely temperature sensitive within the range of normal operating conditions because of the direct relationship between bulb-wall temperature and internal mercury vapor pressure. This results from the fact that the internal pressure, which is normally in the range of six to ten microns will change to a relatively large degree with relatively small changes in temperature.

Changes in vapor pressure affect the light output of fluorescent lamps because the wattage consumed by them varies with changes in mercury vapor pressure and drops off considerably at vapor pressures higher or lower than the optimum value, causing a corresponding reduction in light output. Most important, however, the lamp phosphors generate visible light efficiently only when excited by ultraviolet light of specific wave lengths, which are generated most efficiently by mercury vapor at the optimum vapor pressure.

This temperature sensitivity generally presents no problem when fluorescent lamps are used indoors where ambient air temperatures are relatively constant because the lamps and their surrounding structures may then be designed so that the ambient lamp temperature will be at substantially the optimum value. In outdoor installations, on the other hand, the ambient temperature range may be 100 degrees F. or more so that temperature sensitivity becomes a problem.

It has been found that the optimum internal gas pressure of a lamp can be attained by cooling a relatively small spot on the lamp wall. This causes the internal mercury vapor to condense at this spot and to establish an equilibrium pressure that corresponds to the temperature of the spot. It has also been found that the cooling of a spot comprising less than .15 percent of the lamp surface satisfactorily controls the light output. As a result of the relatively small area that requires refrigeration or cooling, only a relatively small refrigerating capacity is required.

Spot cooling can be applied at almost any point in the bulb wall and if the cooling device is controlled to maintain a constant cold spot temperature, the light output will be substantially constant and near its optimum value. This is true even with wide variations in ambient temperature and even though average bulb wall temperatures may reach very high values.

An object of the invention is to provide a new and improved device for spot cooling a vapor type lamp to improve its light output efficiency.

Another object of the invention is to provide a spot cooling device for vapor type lamps consisting of a self-contained evaporative cooler.

A further object of the invention is to provide a self-contained evaporative cooler for spot cooling vapor type lamps and having means for maintaining the internal system pressure substantially equal to ambient pressure.

These and other objects and advantages of the instant invention will become more apparent from the detailed description thereof taken with the accompanying drawings in which:

FIG. 1 is a front elevational view, partly in section, of one embodiment of the instant invention;
FIG. 2 is a side elevational view of the device shown in FIG. 1;
FIG. 3 is a front elevational view, partly in section, of an alternate embodiment of the instant invention; and
FIG. 4 is a side elevational view of the device shown in FIG. 3.

Referring to the drawings in greater detail, FIG. 1 shows a portion of a fluorescent luminaire 10 having an outer housing 12 formed of relatively rigid sheet metal, a fluorescent lamp 13 positioned within the housing 12 and a reflector 14 affixed to housing 12 in any suitable manner (not shown) and located adjacent the lamp 13 for reflecting the light rays emitted therefrom into the desired light pattern.

The spot cooling device according to the instant invention is suitably affixed to the housing 12 and includes an evaporator 22 extending inwardly of the housing and through the reflector 14 for thermally engaging the lamp 13 and a condenser 18 disposed exteriorly of the housing 12 and communicating with evaporator 17 by a condensate return tube 20 and a vapor tube 21.

The evaporator 22 consists of a hollow tubular member having a heat conductive closure member 24 affixed to its lower end in a hermetically sealed relation. The heat conductive member 24 has a concave surface 26 formed in its lower end which is arcuate in section to conform to the surface of the lamp 13. A second closure member 28 is affixed to the upper end of the tube 22 in a hermetically sealed relation and has a pair of apertures 30 and 32 for receiving the tubes 20 and 21, respectively.

The upper ends of the tubes 20 and 21 are in communication with the condenser 18 which takes the form of a metallic bellows 34 and which is sealed at its lower end by metallic cup member 35. The cup member 35 is provided with apertures 37 and 38 for receiving the upper ends of the tubes 20 and 21, respectively.

As seen in FIG. 1, the tubes 20 and 21 are of substantially equal length. The upper end of the condensate return tube 20 is disposed in the aperture 37 and flush with the lower inside surface of the cup member 35 and its lower end extends downwardly through aperture 30 and into the evaporator 22 to a point beneath the level of the refrigerant 17. The vapor tube 21 is disposed with its lower end in the aperture 32 and flush with the inner surface of the evaporator top closure member 28 and with its upper end extending through the aperture 38 in the cup 35 and upwardly into the interior of the bellows 34.

The conductive member 24, the evaporator 22, the evaporator cover member 28, the tubes 20 and 21, and the bellows base member 35 may all be composed of any suitable metallic material such as brass and may be joined as shown in FIG. 1 in any suitable manner such as by soldering.

The bellows 34 is mounted for expansion and contraction above the housing 12 in a bellows guide assembly 40 which is supported on the luminaire housing 12 by four support rods 42 which are affixed at their lower ends to the housing 12 by screws 43 and which are affixed at their upper ends to a cover plate 44 by means of screws 46. A top plate 48 is rigidly affixed to the upper end of the bellows 34 and has an aperture 47 at each corner for being slidably received on the four support rods 42. A pair of guide rods 49 are attached at their upper ends to the plates 48 by screws 50 and extend downwardly therefrom along the opposite sides of the bellows 34 and between the rods 42 for connection at their lower ends to a bottom plate 52 by screws 53. The bottom plate 52 also has four apertures 54 at its corners which are loosely received on the support rods 42. In addition, a circular central aperture 56 is formed in the bottom plate 52 for receiving an annular skirt 57 extending integrally downward from the bellows 34 and which encircles a tubular member 58 extending upwardly from a circular opening 60 formed in a rectangular plate 61 affixed to the upper surface of the housing 12 by bolts 62. The sleeve 58 surrounds the lower end of the cup 35 and along with the skirt 57 in the aperture 56 provides a guide for the lower end of the bellows 34.

It will be appreciated from the foregoing that the upper end of the bellows will be movable relative to the guide assembly 40 to permit expansion and contraction of the bellows under changes in internal and atmospheric pressures. In addition, the bellows 34 is disposed exteriorly of the luminaire housing 12 so that it will be at a relatively lower temperature than that existing on the interior of housing 12 as a result of the heat emanating from the lamp 13 and any ballasts (not shown) or other electrical apparatus disposed therein.

A U-shaped bracket member 64 having a central aperture 65 for receiving the evaporator tube 22 is affixed to the undersurface of the housing 12 by the bolts 62. Also affixed to the upper surface of the housing 12 is a pair of identical, opposed tube guide plates 66 each having an elongate slot 67 in one side for receiving the tubes 20 and 21. A pair of springs 68 are disposed circumjacent the tubes 20 and 21 and respectively engage at their lower and upper ends the cover 28 of the evaporator tube 22 and washers 70 which surround the tubes 20 and 21 and abut the edges of the slot 67. The springs 68 hold the heat conducting member 24 in engagement with the tubes 13 and counteract the tendency of the bellows 34 to move the evaporator 22 upwardly.

The total volume of the system including the evaporator 22, the tubes 20 and 21, and the bellows 34 should be approximately 10 times the volume of the refrigerant 17. In addition, the refrigerant 17 should have a boiling point approximately equal to the bulb wall temperature necessary for optimum operation. This temperature is in the order of 95° F. for most commercial lamps. One refrigerant which boils at this temperature is isopropyl-chloride.

The purpose of the bellows 34 is to maintain the internal pressure of the system substantially equal to atmospheric pressure. Because atmospheric pressure can, for all practical purposes, be considered constant, this insures that the boiling temperature of the refrigerant 17 will also be relatively constant. In a fixed volume system, on the other hand, the internal system pressure will change in proportion to changes in the temperature of the gas therein, assuming that the mass of the gas is constant. Thus, in a fixed volume system there will be wide changes in the internal gas pressure which, in turn, will cause corresponding changes in the temperature at which the refrigerant will boil.

When the temperature of the wall of the lamp 13 is at or below the optimum value for obtaining the maximum night output, the spot cooling device will be in a state of quiescence. Should the lamp wall temperature exceed this optimum value, the refrigerant 17 will begin to boil and the resulting refrigerant vapor will be carried by the tube 21 into the bellows 34. The heat of vaporization of refrigerant 17 will thus be drawn from the wall of the lamp 13 tending to cool it down to the optimum value. As the vapor enters the interior of the relatively cooler bellows 34, it will begin to condense on the walls thereof and to collect in the cup 35 whereupon it will be returned to the evaporator 22 through the tube 20. The heat given up by the vapor as it condenses on the walls of the bellows 34 will then be dissipated to the ambient. This cycling of the refrigerant 17 will continue until the temperature of the lamp wall again returns to the optimum value whereupon boiling of the refrigerant 17 will cease. In this manner heat is taken from the wall of the lamp 13 by the evaporator 22 and is transferred to the condenser bellows 34 whereupon it is dissipated to the ambient.

FIGS. 3 and 4 show an alternate embodiment of the instant invention applied to a luminaire 80 having an outer housing 81, a lamp 82 and a reflector 83 positioned adjacent the lamp 82. The spot cooling assembly according to the alternate embodiment of the invention is shown to include an evaporator 85 in thermal engagement with the lamp 82, a condenser 86 disposed above the housing 81 and an interconnecting tube assembly 87 for conducting vapor from the evaporator 85 to the condenser 86 and for returning condensate.

The evaporator 85 consists of a tubular member 89 having a frusto-conical upper section 90 which telescopically receives the lower end of a condensate return tube 91. A heat conductive base 92 is affixed to the lower end of the evaporator member 89 and has an arcuate-in-section surface 93 formed in its lower end which corresponds to the contour of the fluorescent tube 82. The base 92 also has a frusto-conical portion 94 extending axially into the member 89.

A funnel 96 resides in the lower end of the member 89 and is spaced from the portion 94 of the evaporator base 92 and terminates at its upper end in a tube 98 which telescopically receives the lower end of a vapor tube 99. The funnel 96 has a plurality of apertures 100 formed therein to permit the refrigerant 102 to flow into its interior and to contact the portion 94 of the evaporator base 92.

The condenser 86 comprises a hollow finned housing which is suitably affixed to the upper slanted portion of the housing 81 so that condensate will flow toward its lower end. The condensate return conduit 91 is connected from the upper end of the evaporator member 89 to the lower end of the condenser 86. The vapor tube 99 is shown to have a smaller diameter than the condensate return tube 91 and to extend coaxially therewithin to the upper end of the evaporator 86. A spring 101, engaging the frusto-conical section 90 of the evaporator tube 89 and the upper surface of the funnel 96, maintains the funnel in its proper position relative to the tube 89 and the portion 94 of the base 92.

In order to prevent the ambient temperature within the luminaire 80 from influencing the operation of the spot cooling device a thermal insulating sleeve 103 surrounds the evaporator 85 and a thermal insulation tube 104 surrounds the tubes 91 and 99.

In order to resiliently urge the lamp 82 and the conductor base 92 into engagement, a spring loaded socket assembly 106 is provided at one end of the luminaire. This assembly includes a generally C-shaped bracket 107 affixed to the housing 81 and having slots 108 and 109 formed in its upper and lower ends for receiving a floating bracket 110 which carries the lamp socket 112. A spring 113 is disposed circumjacent the upper end of the bracket 110 and engages the upper surface of the fixed bracket 107 and a fixed washer 114 at the upper end of bracket 110. Thus, the lamp 82 is resiliently urged upwardly into engagement with the evaporator base 92.

When the temperature of the lamp 82 exceeds the boiling temperature of the refrigerant 102, this heat will be transmitted to the refrigerant below the funnel 96 by the conductor base 92. Boiling of the refrigerant will be facilitated by the relatively small quantity of refrigerant below the funnel 96 and by the relatively large area of the portion 94. As the refrigerant boils it will be directed by the funnel 96 into the vapor tube 99 which will conduct it to the upper end of the condenser 86. This vapor will then condense on the walls of the relatively cooler evaporator 86 whereupon it will flow to the lower end thereof and return to the evaporator 89 by the condensate return tube 91.

While only two embodiments of the instant invention have been shown and described, it is not intended that the invention be limited thereby but only by the scope of the appended claims.

We claim:

1. A device for cooling a vapor type lamp comprising, an evaporator having a substantially hollow interior, means secured to said evaporator for thermally engaging the bulb wall of said lamp, a condenser having a substantially hollow interior, tube means interconnecting the hollow interiors of said evaporator and said condenser, a refrigerant capable of existing in gaseous and liquid forms, said refrigerant being located in hollow portions of said device so as to transfer heat absorbed in the bulb wall to the condenser for dissipation, said device including pressure equalizing means for maintaining its internal gas pressure substantially equal to the ambient pressure.

2. A device for cooling a vapor type lamp comprising, an evaporator having a substantially hollow interior, means secured to said evaporator for thermally engaging said lamp, connecting tubes each having one end thereof joined to said evaporator and communicating at different levels with the hollow interior thereof, a condenser having a substantially hollow interior, said connecting tubes each having the other end thereof in communication with the hollow interior of said condenser but at different levels thereof, a refrigerant capable of existing in gaseous and liquid forms, said refrigerant being located in the hollow portions of said device so as to transfer heat absorbed from the bulb wall to the condenser for dissipation, said device also including pressure equalizing means for maintaining the internal gas pressure substantially equal to the ambient pressure.

3. The device set forth in claim 2 wherein said condenser comprises a bellows having one of its ends mounted for expansion and contraction under the influence of ambient pressure so that the pressure within said device will be substantially equal to the ambient pressure.

4. A device for cooling a vapor type lamp comprising, an evaporator having a substantially hollow interior, means secured to said evaporator for thermally engaging the bulb wall of said lamp, a pair of connecting tubes each having one end thereof joined to said evaporator and communicating at different levels with the hollow interior thereof, a condenser having a substantially hollow interior, said connecting tubes each having their other ends in communication with the hollow interior of said condenser but at different levels thereof, said tubes having different diameters and being concentrically arranged, the inner of said tubes communicating with a lower portion of said evaporator and having an apertured funnel disposed at its lower end, a refrigerant capable of existing in gaseous and liquid forms, said refrigerant being located in the hollow portions of said device so as to transfer heat absorbed from the bulb wall to the condenser for dissipation.

5. A sealed device for cooling a vapor type lamp comprising, an evaporator having a substantially hollow interior, means secured to said evaporator for thermally engaging the bulb wall of said lamp, a condenser having a substantially hollow interior, a pair of connecting tubes, one of said tubes having one end communicating with a lower portion of said evaporator and its other end with a lower portion of said condenser, the other of said tubes having one end communicating with an upper portion of said evaporator and its other end with an upper portion of said condenser, said condenser including diaphragm means having one side exposed to the interior thereof and the other side exposed to the ambient to maintain the internal pressure of said device substantially equal to the ambient pressure, refrigerant capable of existing in gaseous and liquid forms, said refrigerant being located in the hollow portions of said device so as to transfer heat absorbed from the bulb wall to the condenser for dissipation.

6. A device for cooling a vapor type lamp comprising, an evaporator having a substantially hollow interior, means secured to said evaporator for thermally engaging the bulb wall of said lamp, a condenser having a substantially hollow interior, a pair of connecting tubes, said tubes having different diameters and being concentrically arranged, the inner of said tubes having one end communicating with a lower portion of said evaporator and its other end with an upper portion of said condenser, the outer of said tubes having one end communicating with an upper portion of said evaporator and its other end with a lower portion of said condenser, an apertured funnel disposed at the one end of said inner tube, refrigerant capable of existing in gaseous and liquid forms, said refrigerant being located in the hollow portions of said device so as to transfer heat absorbed from the bulb wall to the condenser for dissipation.

References Cited
UNITED STATES PATENTS

| | | | |
|---|---|---|---|
| 2,961,476 | 11/1960 | Maslin | 62—119 |
| 3,035,419 | 5/1962 | Wigert | 62—259 |
| 3,112,890 | 12/1963 | Smelling | 62—119 |
| 3,141,621 | 7/1964 | Tolbert | 62—119 |

WILLIAM J. WYE, *Primary Examiner.*

ROBERT A. O'LEARY, *Examiner.*